United States Patent [19]

Vetter

[11] Patent Number: 4,458,483
[45] Date of Patent: Jul. 10, 1984

[54] ROCKET MOTOR END FLAP

[75] Inventor: Ronald F. Vetter, Ridgecrest, Calif.

[73] Assignee: United States of America as represented by the Secretary of the Navy, Washington, D.C.

[21] Appl. No.: 435,818

[22] Filed: Oct. 21, 1982

[51] Int. Cl.³ ............................................. F02K 9/38
[52] U.S. Cl. ................................. 60/253; 102/290
[58] Field of Search ................ 60/39.47, 252, 253, 60/254, 255, 271; 89/1.812; 102/289, 290

[56] References Cited

U.S. PATENT DOCUMENTS

| | | | |
|---|---|---|---|
| 3,044,254 | 7/1962 | Adelman | 60/39.47 |
| 3,166,896 | 1/1965 | Breitengross et al. | 60/39.47 |
| 3,263,613 | 8/1966 | Rice et al. | 102/98 |
| 3,564,845 | 2/1971 | Friedman, Jr. et al. | 60/39.47 |
| 3,954,701 | 5/1976 | Schaffling | 260/42.28 |
| 3,973,397 | 8/1976 | Chase et al. | 60/253 |
| 3,985,592 | 10/1976 | Hackett et al. | 149/4 |
| 3,991,565 | 11/1976 | Gordon et al. | 60/255 |
| 4,001,126 | 1/1977 | Marion et al. | 252/62 |
| 4,085,584 | 4/1978 | Jones et al. | 60/250 |
| 4,365,558 | 12/1982 | Lippler et al. | 102/290 |

Primary Examiner—Louis J. Casaregola
Attorney, Agent, or Firm—Robert F. Beers; W. Thom Skeer

[57] ABSTRACT

An end flap construction for a rocket motor prevents hot vapors from entering the motor void and causing motor ignition.

7 Claims, 1 Drawing Figure

ROCKET MOTOR END FLAP

BACKGROUND OF THE INVENTION

1. Field of the Invention

This invention pertains to the fields of pyronomics and propulsion design. More particularly, the invention pertains to the design of a solid propellant motor which is resistant to damage by externally applied heat. By way of further characterization, but without limitation thereto, the invention pertains to a rocket motor design which is resistant to being damaged by fires as might be encountered on an aircraft carrier or other navel vessel.

2. Description of the Prior Art

Prior solid state rocket motors have used a wide variety of thermal barriers on the exterior of the motor casing to prevent ignition or explosion by ambient fires external to rocket or to ameliorate the hazards of such undesired combustion. To this end standards of construction have been formulated which serve as a guide in these areas. However, despite careful observance of these perferred techniques, rocket motor failures of a catastrophic nature have been observed where conditions should have prevented such failures.

It has been shown that some of the rocket motors have failed because the external heat has caused vaporization of the layer of bonding material between the motor propellant grain and the motor case. The hot vapors, thus produced, enter the central void of the rocket motor and causes ignition.

Although end closures of rocket motor grains are known, none of the prior systems are effective to prevent gaseous products of liner decomposition from entering the central void of the rocket motor propellant grain.

BRIEF DESCRIPTION OF THE INVENTION

The invention prevents gaseous products of liner decomposition from entering the rocket motor by providing a closure for the aft end of the rocket grain which is constructed to vent the gas expelled from the liner without permitting grain ignition.

It is accordingly an object of this invention to provide an improved rocket motor.

A further object of this invention is to provide a safety device for solid grain rocket motors.

A still further object of this invention is to provide a rocket motor construction which is configured to optimize safety without sacrificing motor efficiency.

These and other objects of the invention will become apparent in view of the following disclosure, claims, and drawings.

BRIEF DESCRIPTION OF THE DRAWING

The drawing is a sectional view of the rocket motor according to the invention.

DESCRIPTION OF THE PREFERRED EMBODIMENT

Figure 1:
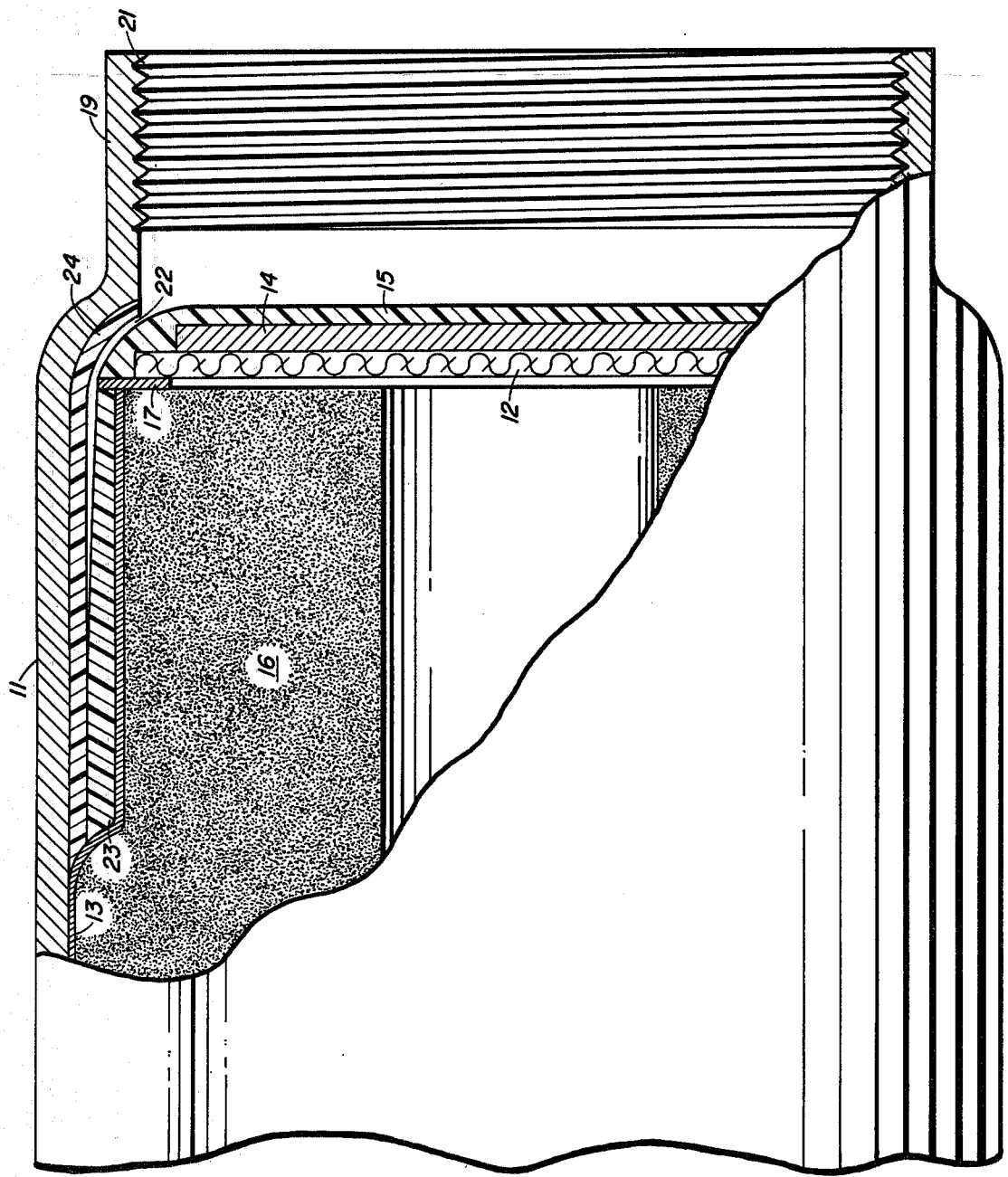

The explosion and violent ignition of a motor weakened by prolonged heat may occur when the propellant grain is ignited along the central void in the grain as in the case of normal motor operation. One cause of central void ignition is the outgassing of the cementious bond or insulation layer producing a flow of hot gas which escapes from the aft end of grain to cause ignition.

Referring to the Figure, a solid propellant rocket motor case 11 has a solid propellant grain 16 contained therein. Motor case 11 has a liner layer 13 adhered thereto. Such liner layers are conventional in solid propellant motors and serves as an inhibitor and contain an adhesive of the same type as used in the binder of propellant grain 16 to promote a good bond. A nozzle, not shown, is attached to a nozzle extension 19 by threads 21. A stress relief boot 22 is affixed to motor casing 11 in the vicinity of the nozzle end.

Stress relief boot 22 is conventional in the solid propellant motor art and includes two concentric sleeves 23 and 24 made of butyl rubber cemented at their forward end and left unconnected at the aft end adjacent 19. This boot assembly or flap, as it is sometimes called, protects grain 16 from thermal and mechanical stresses.

When motor case 11 is subjected to external heat, such as a fuel fire on an aircraft carrier, the casing heats and causes liner layer 13 to produce a hot gaseous vapor which travels rearward toward nozzle extension 19 to vent therefrom. This venting gas may cause motor ignition if it is allowed to enter the central void of rocket motor grain 16.

The entry of the vapor is prevented by the invention by providing a gas tight seal across the nozzle end of motor grain 16. A rigid sheet 12, which may be made of reinforced glass-cloth or similar material, forms the foundation of the seal. A sheet 14 of stiffening material is attached to rigid sheet 12 on the nozzle side thereof. Sheet 14 provides stiffening from forces applied on the nozzle side thereof without offering sufficient resistance to motor ignition produced gases. Cork has proven a satisfactory material for stiffener sheet 14 in developmental models, however, other materials may be substituted following standard engineering trade-offs.

A thermally stable coating 15 overlays sheets 12 and 14 to provide a unitary assembly which is secured to motor grain 16 by a marginal ring of adhesive 17. Adhesive ring 17 is made of a material which is the same as binder layer 13 or similarly compatible with the binder in propellant grain 16. Coating 15 is made of a silicone material in developmental models. However, coating 15 may be made of other materials which are compatible with sheets 12 and 14 and provides the required thermal stability.

When subjected to external heat, motor casing 11 causes binder 13 to produce the same hot vapors as in the prior art motor constructions. The vapors travel to the exterior of motor casing passing between motor casing 11 and grain 16 along barrier layer 13 and boot 22. These vapors are prevented from entering the center void of grain 16 by sheets 12, 14, and coating 15 and pass out nozzle extension 19.

When motor grain 16 is ignited, the exiting gasses break apart the flap structure and force its expulsion through nozzle extension 19 and any nozzle attached thereto. This rapid expulsion of the motor end flap construction is of such a nature and duration that the operation of the rocket is unimpaired.

The foregoing description taken together with the appended claims and drawing constitute a disclosure such as to enable a person skilled in the rocket motor and propellant arts and having the benefit of the teachings contained therein to make and use the invention. Further, the structure herein described meets the objects of the invention, and generally constitutes a meritorious advance in these arts which are unobvious to such a skilled worker not having the benefit of these teachings.

I claim:

1. A safety device for a rocket motor having a propellant grain with a central void comprising:
   a sheet of rigid material having an inner and outer surface configured to close said propellant grain;
   a layer of adhesive securing said sheet of material to said grain about the periphery of said inner surface thereof;
   a stiffener separate from but attached to the exterior surface of said sheet of rigid material; and
   a thermally stable coating over said sheet and said stiffener.

2. A safety device according to claim 1 wherein said sheet is a reinforced glass-cloth material.

3. A safety device according to claim 1 wherein said stiffener is a cork membrane.

4. A safety device according to claim 1 wherein said thermally stable coating is formed of a silicone material.

5. A safety device according to claim 2 wherein said stiffener is a cork membrane.

6. A safety device according to claim 2 wherein said thermally stable coating is formed of a silicone material.

7. A safety device according to claim 3 wherein said thermally stable coating is formed of a silicone material.

* * * * *